US009122996B2

(12) United States Patent
Lien et al.

(10) Patent No.: US 9,122,996 B2
(45) Date of Patent: Sep. 1, 2015

(54) METHOD OF PERFORMING REAL-TIME CORRECTION OF A WATER STAGE FORECAST

(75) Inventors: Ho-Cheng Lien, Hsinchu (TW); Shiang-Jen Wu, Hsinchu (TW); Chih-Tsung Hsu, Taoyuan (TW)

(73) Assignee: National Applied Research Laboratories, Daan Dist. Taipei (TW)

( * ) Notice: Subject to any disclaimer, the term of this patent is extended or adjusted under 35 U.S.C. 154(b) by 273 days.

(21) Appl. No.: 13/565,778

(22) Filed: Aug. 2, 2012

(65) Prior Publication Data

US 2013/0212048 A1 Aug. 15, 2013

(30) Foreign Application Priority Data

Feb. 15, 2012 (TW) .............................. 101104953 A

(51) Int. Cl.
| G06F 15/18 | (2006.01) |
| G06N 99/00 | (2010.01) |
| G06Q 10/04 | (2012.01) |
| G01W 1/10 | (2006.01) |

(52) U.S. Cl.
CPC .............. *G06N 99/005* (2013.01); *G06Q 10/04* (2013.01); *G01W 1/10* (2013.01)

(58) Field of Classification Search
None
See application file for complete search history.

(56) References Cited

U.S. PATENT DOCUMENTS

| 6,862,528 | B2 | 3/2005 | Scannell | |
| 7,334,450 | B1 | 2/2008 | Scott | |
| 2003/0229290 | A1* | 12/2003 | George et al. ................. | 600/532 |

FOREIGN PATENT DOCUMENTS

| CN | 101625732 A | 1/2010 |
| CN | 102183972 B | 9/2012 |
| TW | 499013 | 8/2002 |
| TW | 200613759 | 5/2006 |

OTHER PUBLICATIONS

Hsu, Ming-Hsi, Jin-Cheng Fu, and Wen-Cheng Liu. "Flood routing with real-time stage correction method for flash flood forecasting in the Tanshui River, Taiwan." Journal of hydrology 283.1 (2003): 267-280.*
Madsen, Henrik, and Claus Skotner. "Adaptive state updating in real-time river flow forecasting-a combined filtering and error forecasting procedure." Journal of Hydrology 308.1 (2005): 302-312.*
Professor Stephen R. Lawrence Demand Forecasting: Time Series Models Retrieved from <https://web.archive.org/web/20080319232051/http://leeds-faculty.colorado.edu/lawrence/tools/FORECAST/forecast.ppt> on Jun. 19, 2014 (2008).*
Dee, Dick P., and Arlindo M. Da Silva. "Data assimilation in the presence of forecast bias." Quarterly Journal of the Royal Meteorological Society 124.545 (1998): 269-295.*

* cited by examiner

*Primary Examiner* — Kakali Chaki
*Assistant Examiner* — Kevin W Figueroa
(74) *Attorney, Agent, or Firm* — Winston Hsu; Scott Margo

(57) ABSTRACT

A method of performing real-time correction of a water stage forecast includes obtaining at least one predicted water stage of at least one time and a predicted water stage of a next time after the at least one time; obtaining at least one observed water stage of the at least one time; generating a system error of the water stage forecast according to the at least one observed water stage, the at least one predicted water stage, the predicted water stage of the next time, a Time Series method, and an Average Deviation method; utilizing a Kalman filter method to generate a random error of the water stage forecast; generating a water stage forecast correction of the next time according to the system error and the random error; and correcting a predicted water stage of the next time according to the water stage forecast correction and the predicted water stage.

3 Claims, 2 Drawing Sheets

METHOD OF PERFORMING REAL-TIME CORRECTION OF A WATER STAGE FORECAST

BACKGROUND OF THE INVENTION

1. Field of the Invention

The present invention relates to a method of performing real-time correction of a water stage forecast, and particularly to a method of performing real-time correction of a water stage forecast that can utilize a Time Series method and a Kalman filter to correct a predicted water stage of a lead time. The proposed method for the error forecast is developed based on the forecasts of water stages at the lead time and the estimated water stages at previous time steps during a storm event as well as the associated the forecast error. It is Noted that this significantly differs from the other approaches for correcting the forecasted water stages.

2. Description of the Prior Art

In human history, floods are one of the most severe risks to human life and property. Therefore, water stage forecasts play an important and essential role in real-time water stage (e.g. rivers, lakes, and so on) management, where the water stage forecasts include flood control, flood warnings, reservoir operation and river regulation. The water stage forecasts can increase a lead time applied to a quantitative precipitation forecast (QPF) of a transformation of rainfall into runoff and travel time in main rivers catchments. Therefore, real-time water stage forecast, warning, and response systems aim to extend the lead time to people living on floodplains, so that they can take earlier action to save themselves and their property.

However, in any flood forecast system, uncertainty in the water stage forecast is caused by some factors (e.g. input uncertainty, model structure uncertainty, and parameter uncertainty). Therefore, because of the intrinsic uncertainty of meteorological forecasts, rainfall uncertainty (a type of input uncertainty) has more significant influence on the water stage forecast than other types of uncertainty (that is, the model structure uncertainty and the parameter uncertainty). In addition, the input uncertainty contributes inherent uncertainty in hydrologic and dynamic flow models that adds to the model structure uncertainty and the parameter uncertainty.

To sum up, reliability of the water stage forecast tends to decrease with increase of the lead time. That is to say, uncertainty in the water stage forecast generally increases with a lead time for implementing flood protection measures, so that the simulated and forecasted hydrographs may not perfectly fit the hydrographic measurements. Therefore, a water stage forecast provided by the prior art may not meet water stage forecast requirements for humanity.

SUMMARY OF THE INVENTION

An embodiment provides a method of performing real-time correction of a water stage forecast. The method includes obtaining at least one predicted water stage of at least one time and a predicted water stage of a next time after the at least one time, wherein a previous time of the at least one time is a current time; obtaining at least one observed water stage of the at least one time; generating a system error of the water stage forecast according to the at least one observed water stage of the at least one time, the at least one predicted water stage of the at least one time, the predicted water stage of the next time, a Time Series method, and an Average Deviation method; utilizing a Kalman filter method to generate a random error of the water stage forecast; generating a water stage forecast correction of the next time according to the system error and the random error; and correcting a predicted water stage of the next time according to the water stage forecast correction of the next time and the predicted water stage of the next time.

The present invention provides a method of real-time correction of water stage forecast. The method utilizes a Time Series method and a Kalman filter to correct at least one predicted water stage of at least one lead time to improve disadvantages of the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
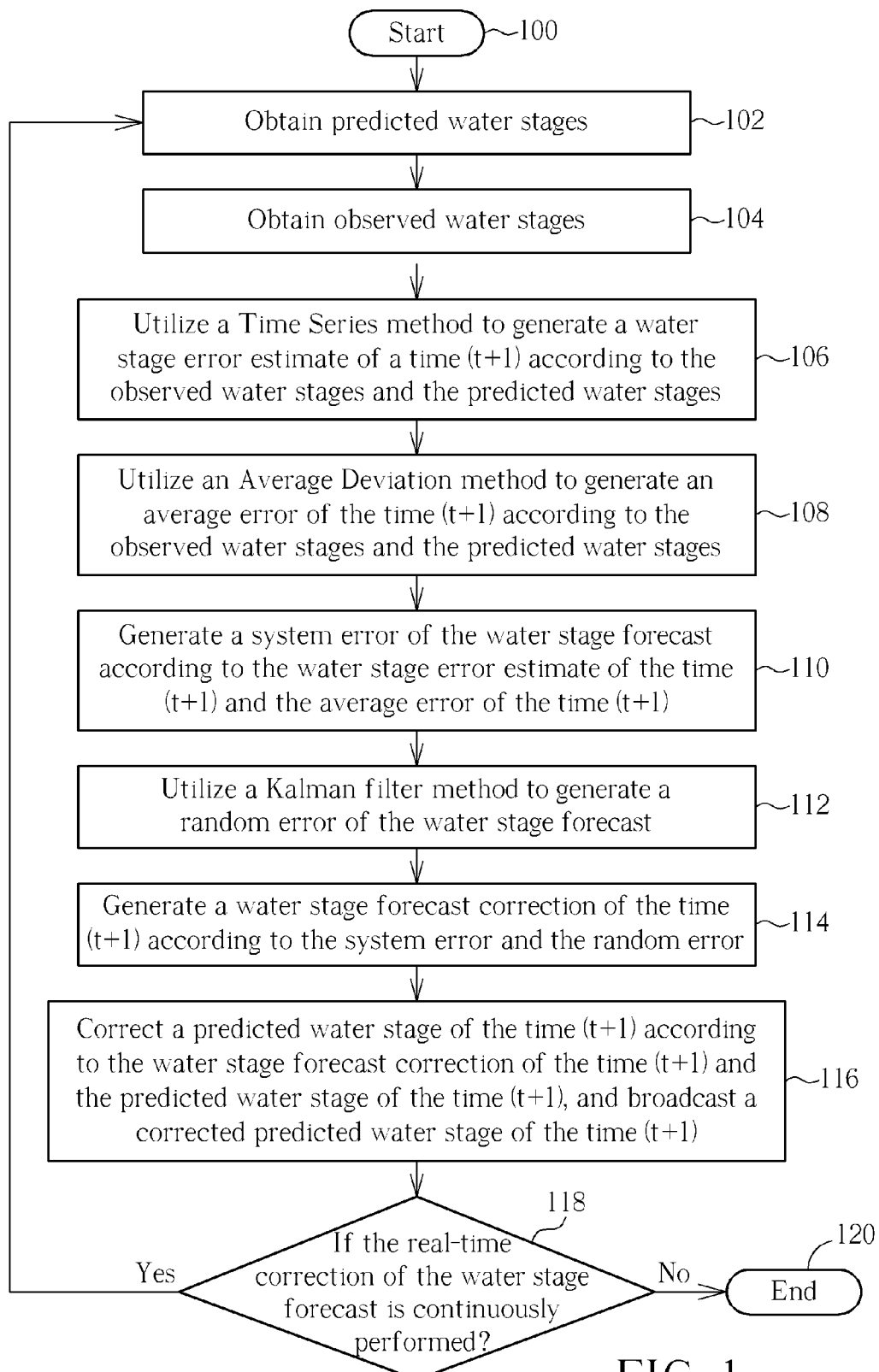
FIG. 1 is a flowchart illustrating a method of real-time correction of water stage forecast according to an embodiment.

Please refer to FIG. 1. FIG. 1 is a flowchart illustrating a method of performing real-time correction of a water stage forecast according to an embodiment. Detailed steps are as follows:

Step 100: Start.

Step 102: Obtain predicted water stages $H_{pred}^{t+1}$, $H_{pred}^{t}$, $H_{pred}^{t-1}$, ..., $H_{pred}^{t-p}$.

Step 104: Obtain observed water stages $H_{obs}^{t}$, $H_{obs}^{t-1}$, ..., $H_{obs}^{t-p}$.

Step 106: Utilize a Time Series method to generate a water stage error estimate of a time (t+1) according to the observed water stages $H_{obs}^{t}$, $H_{obs}^{t-1}$, ..., $H_{obs}^{t-p}$ and the predicted water stages $H_{pred}^{t+1}$, $H_{pred}^{t}$, $H_{pred}^{t-1}$, ..., $H_{pred}^{t-p}$.

Step 108: Utilize an Average Deviation method to generate an average error of the time (t+1) according to the observed water stages $H_{obs}^{t}$, $H_{obs}^{t-1}$, ..., $H_{obs}^{t-p}$ and the predicted water stages $H_{pred}^{t+1}$, $H_{pred}^{t}$, $H_{pred}^{t-1}$, ..., $H_{pred}^{t-p}$.

Step 110: Generate a system error $\epsilon_{sum}$ of the water stage forecast according to the water stage error estimate of the time (t+1) and the average error of the time (t+1).

Step 112: Utilize a Kalman filter method to generate a random error $\epsilon_{KF}$ of the water stage forecast.

Step 114: Generate a water stage forecast correction of the time (t+1) according to the system error $\epsilon_{sum}$ and the random error $\epsilon_{KF}$.

Step 116: Correct a predicted water stage of the time (t+1) according to the water stage forecast correction of the time (t+1) and the predicted water stage of the time (t+1), and broadcast a corrected predicted water stage of the time (t+1).

Step 118: If the real-time correction of the water stage forecast is continuously performed, go to Step 102; if no, go to Step 120.

Step 120: End.

In step 102, the predicted water stages $H_{pred}^{t+1}$, $H_{pred}^{t}$, $H_{pred}^{t-1}$, ..., $H_{pred}^{t-p}$ can be obtained from a water stage forecast platform, where $H^{*}_{pred}$ is a predicted water stage at any time, t represents a current time, t+1 represents a lead time, t−1 represents a previous time, and t−p represents a previous $p^{th}$ time of the current time. In step 104, the observed water stages $H_{obs}^{t}$, $H_{obs}^{t-1}$, ..., $H_{obs}^{t-p}$ can be obtained from the water stage forecast platform, where $H^{*}_{obs}$ is an observed water stage at any time. In step 106, the water stage error estimate of the lead time (that is, the time (t+1)) is generated by the Time Series method according to the observed water stages $H_{obs}^t, H_{obs}^{t-1}, \ldots, H_{obs}^{t-p}$, the predicted water stages $H_{pred}^{t+1}, H_{pred}^t, H_{pred}^{t-1}, \ldots, H_{pred}^{t-p}$, and equation (1):

$$\epsilon_t = H_{pred}^t - H_{obs}^t$$

$$\epsilon_{TSM}^{t+1} = f(H_{pred}^{t+1}, H_{pred}^t, H_{pred}^{t-1}, \ldots, H_{pred}^{t-p}, \epsilon_t, \epsilon_{t-1}, \ldots, \epsilon_{t-p}) \quad (1)$$

As shown in equation (1), $\epsilon_{TSM}^{t+1}$ is the water stage error estimate of the lead time generated by a Time Series model f, $\epsilon_t$ is a water stage error of the current time (that is, the time t), $\epsilon_{t-1}$ is a water stage error of the previous time (that is, the time (t-1)), and $\epsilon_{t-p}$ is a water stage error of the previous $p^{th}$ time (that is, the time (t-p)) of the current time. As shown in equation (1), the Time Series Model f is first determined by a user. That is, a forecast error of the water stage can be calculated after an order of the Time Series model f is determined. In order to reduce time for correcting the predicted water stage, the first order of the Time Series models f are selected. That is to say, the Time Series models of AR(1), AR(2), MA(1), MA(2), AR(1, 1), and so on are selected, where AR is an abbreviation for Auto-Regression and MA is an abbreviation for Moving Average.

In order to solve a problem of insufficient observed water stages in the flood forecasting period, the Average Deviation method can be utilized. In step 108, the average error of the time (t+1) is generated according to the observed water stages $H_{obs}^t, H_{obs}^{t-1}, \ldots, H_{obs}^{t-p}$ and the predicted water stages $H_{pred}^{t+1}, H_{pred}^t, H_{pred}^{t-1}, \ldots, H_{pred}^{t-p}$, and equation (2):

$$\varepsilon_{AD}^{t+1} = \frac{1}{n}\sum_{i=1}^{n}[H_{pred}^{t-n+i} - H_{obs}^{t-n+i}], n = 1, 2, \ldots, N_{sp} \quad (2)$$

As shown in equation (2), $\epsilon_{AD}^{t+1}$ is the average error of the time (t+1), $N_{SP}$ is a predetermined interval number for calculating the average error $\epsilon_{AD}^{t+1}$ of the time (t+1), $H_{pred}^{t-n+i}$ is a predicted water stage of a previous $(n-i)^{th}$ time of the current time, and $H_{obs}^{t-n+i}$ is an observed water stage of the previous $(n-i)^{th}$ time of the current time, where (n-i) is an integer.

Because various Time Series models can be applied for different lead times, the present invention adopts a concept of Forecast combination to utilize correction results of AR(1), AR(2), MA(1), MA(2), and ARMA(1,1) and equation (3) to generate a water stage forecast correction $H_{pred,TS}^t$ of the current time, where ARMA is an abbreviation for Auto-Regression Moving Average:

$$H_{pred,m}^t = H_{pred}^t + \varepsilon_{TSM,m}^t;$$

$$H_{pred,TS}^t = \frac{1}{N_{model}}\sum_{m=1}^{N_{model}} H_{pred,m}^t; \quad (3)$$

As shown in equation (3), $N_{model}$ is a number of the Time Series model (that is 5), $\epsilon_{TSM,m}^t$ is a water stage error estimate of the current time generated by an $m^{th}$ mode of the Time Series model f, $H_{pred,m}^t$ is the water stage forecast correction of the current time corresponding to the water stage error estimate $\epsilon_{TSM,m}^t$ of the current time generated by the $m^{th}$ mode of the Time Series model f, and $H_{pred,TS}^t$ is the water stage forecast correction of the current time generated by the Time Series model f.

In step 110, the system error $\epsilon_{sum}$ of the water stage forecast is generated according to the water stage error estimate of the time (t+1) and the average error of the time (t+1), and equation (4):

$$\varepsilon_{sum} = \frac{1}{N_{model}}\sum_{i=1}^{N_{model}} \varepsilon_{TSM,i}^{t+1} + \varepsilon_{AD}^{t+1} \quad (4)$$

As shown in equation (4), $\epsilon_{TSM,m}^{t+1}$ is the water stage error estimate of the time (t+1) generated by the $m^{th}$ mode of the Time Series model f.

In theory, a real-time correction mode (that is, the Time Series model) of a predicted water stage based on the Time Series method can effectively reduce errors caused by uncertainty in various hydrological, physiographic, and meteorological models to significantly increase accuracy and reliability of information of the water stage forecast, but a water stage can still have abnormal variation caused by unpredictable and uncertain factors (e.g. uncertainty in an observed water stage or forecast rainfall). Therefore, the present invention further adopts the Kalman filter method to correct the predicted water stage.

In step 112, the random error (an error of the Kalman filter method) is generated according to equation (5):

$$\epsilon_{KF} = K_{KF}(H_{obs}^t - H_{pred,TS}^t) \quad (5)$$

As shown in equation (5), $\epsilon_{KF}$ is the random error, $K_{KF}$ is a Kalman gain, and $H_{pred,TS}^t$ (as shown in equation (3)) is the water stage forecast correction of the current time generated by the Time Series model f.

In step 114, the water stage forecast correction of the time (t+1) is generated according to the system error $\epsilon_{sum}$, the random error $\epsilon_{KF}$, and equation (6):

$$\varepsilon_{comb}^{t+1} = \frac{1}{N_{model}}\sum_{m=1}^{N_{model}} \varepsilon_{TSM,m}^{t+1} + \varepsilon_{AD}^{t+1} + \varepsilon_{KF} \quad (6)$$

As shown in equation (6), $\epsilon_{comb}^{t+1}$ is the water stage forecast correction of the time (t+1).

In step 116, the predicted water stage $H_{pred}^{t+1}$ of the time (t+1) is corrected according to the water stage forecast correction $\epsilon_{comb}^{t+1}$ of the time (t+1), the predicted water stage $H_{pred}^{t+1}$ of the time (t+1), and equation (7) to generate the water stage forecast correction of the time (t+1):

$$H_{corr}^{t+1} = H_{pred}^{t+1} + \epsilon_{comb}^{t+1} \quad (7)$$

As shown in equation (7), $H_{corr}^{t+1}$ is the water stage forecast correction of the time (t+1).

In Step 118, if the user wants to obtain a water stage forecast correction of a time (t+2), step 102 to step 116 are repeated to generate the water stage forecast correction of the time (t+2).

Figure 2:
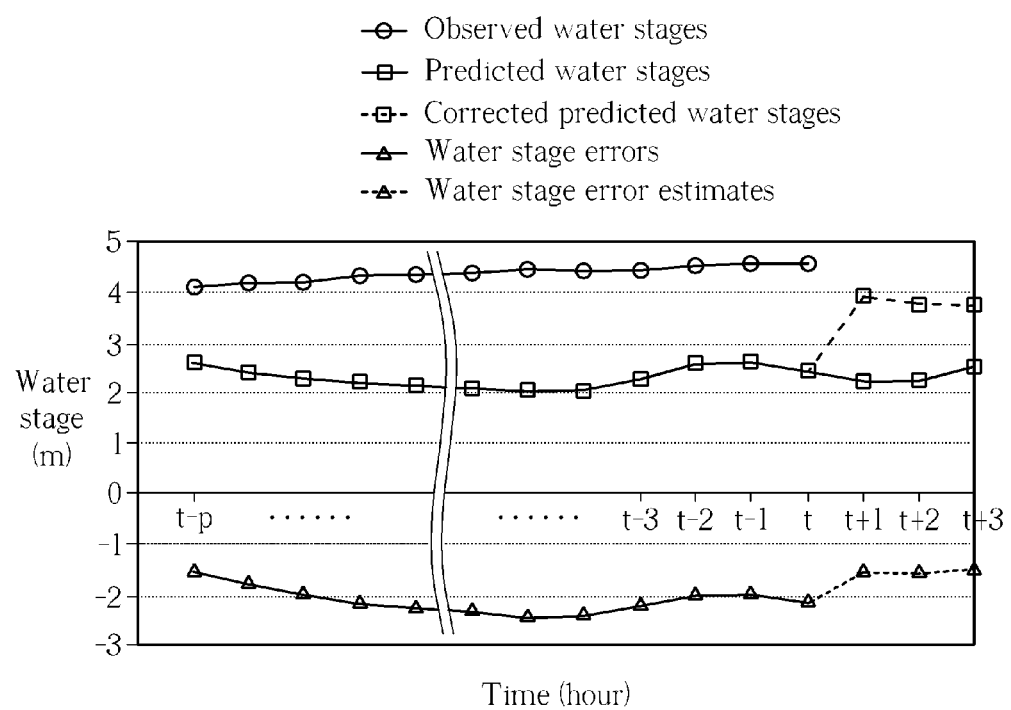
FIG. 2 is a diagram illustrating at least one water stage forecast correction through the method in FIG. 1.

Please refer to FIG. 2. FIG. 2 is a diagram illustrating at least one water stage forecast correction through the method in FIG. 1. As shown in FIG. 2, the predicted water stages $H_{pred}^t, H_{pred}^{t-1}, \ldots, H_{pred}^{t-p}$ and the observed water stages $H_{obs}^t, H_{obs}^{t-1}, \ldots, H_{obs}^{t-p}$ are utilized to generate a water stage forecast correction of a lead time (e.g. a time (t+1), a time (t+2), a time (t+3), and so on). Then, a corrected predicted water stage of the lead time can be obtained according to the water stage forecast correction of the lead time and a predicted water stage of the lead time.

To sum up, in theory, the real-time correction mode of the predicted water stage based on the Time Series method can effectively reduce errors caused by uncertainty in various hydrological, physiographic, and meteorological models to significantly increase accuracy and reliability of information of the water stage forecast. However, the water stage can still have abnormal variation caused by unpredictable and uncertain factors (e.g. uncertainty in the observed water stage or forecast rainfall). Therefore, the present invention utilizes the Time Series method and the Kalman filter to correct a predicted water stage of a lead time to improve disadvantages of the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing real-time correction of a water stage forecast, the method comprising:

obtaining at least one predicted water stage of at least one time and a predicted water stage of a next time after the at least one time, wherein a previous time of the at least one time is a current time;

obtaining at least one observed water stage of the at least one time;

utilizing a Time Series method to generate a water stage error estimate of the next time according to a following equation:

$$\epsilon_{TSM}^{t+1} = f(H_{pred}^{t+1}, H_{pred}^{t}, H_{pred}^{t-1}, \ldots, H_{pred}^{t-p}, \epsilon_t, \epsilon_{t-1}, \ldots, \epsilon_{t-p});$$

wherein:

$\epsilon_{TSM}^{t+1}$ is the water stage error estimate of the next time generated by a Time Series model f;

$\epsilon_t = H_{pred}^{t} - H_{obs}^{t}$;

$H_{pred}^{t}$ is a predicted water stage of the current time of the at least one time;

$H_{pred}^{t+1}$ is the predicted water stage of the next time;

$H_{pred}^{t-1}$ is a predicted water stage of a previous time of the current time;

$H_{pred}^{t-p}$ is a predicted water stage of a previous $p^{th}$ time of the current time, wherein p is an integer greater than 1;

$H_{obs}^{t}$ is an observed water stage of the current time;

$\epsilon_t$ is a water stage error of the current time;

$\epsilon_{t-1}$ is a water stage error of the previous time;

$\epsilon_{t-p}$ is a water stage error of the previous $p^{th}$ time;

utilizing an Average Deviation method to generate an average error of the next time according to a following equation:

$$\varepsilon_{AD}^{t+1} = \frac{1}{n}\sum_{i=1}^{n}[H_{pred}^{t-n+i} - H_{obs}^{t-n+i}], n = 1, 2, \ldots, N_{sp};$$

wherein:

$\epsilon_{AD}^{t+1}$ is the average error of the next time $N_{SP}$ is a predetermined interval number for calculating the average error of the next time;

$H_{pred}^{t-n+i}$ is a predicted water stage of a previous $(n-i)^{th}$ time of the current time;

$H_{obs}^{t-n+i}$ is an observed water stage of the previous $(n-i)^{th}$ time of the current time, wherein (n-i) is an integer;

generating a system error of the water stage forecast according to the water stage error estimate of the next time and the average error of the next time;

utilizing a Kalman filter method to generate a random error of the water stage forecast;

generating a water stage forecast correction of the next time using values of the system error and the random error at a same time according to a following equation:

$$\varepsilon_{comb}^{t+1} = \frac{1}{N_{model}}\sum_{m=1}^{N_{model}}\varepsilon_{TSM,m}^{t+1} + \varepsilon_{AD}^{t+1} + \varepsilon_{KF};$$

wherein:

$\epsilon_{KF}$ is the random error;

$\epsilon_{comb}^{t+1}$ is the water stage forecast correction of the next time;

$N_{model}$ is a model number of the Time Series; and $\epsilon_{TSM,m}^{t+1}$ is the water stage error estimate of the next time generated by an $m^{th}$ mode of the Time Series model f; and correcting a predicted water stage of the next time according to the water stage forecast correction of the next time and the predicted water stage of the next time.

2. The method of claim 1, wherein the random error is generated according to the following equation:

$$H_{pred,m}^{t} = H_{pred}^{t} + \varepsilon_{TSM,m}^{t};$$

$$H_{pred,TS}^{t} = \frac{1}{N_{model}}\sum_{m=1}^{N_{model}} H_{pred,m}^{t}; \text{ and}$$

$$\varepsilon_{KF} = K_{KF}(H_{obs}^{t} - H_{pred,TS}^{t});$$

wherein:

$\epsilon_{KF}$ is the random error;

$K_{KF}$ is a Kalman gain;

$\epsilon_{TSM,m}^{t}$ is the water stage error estimate of the current time generated by the $m^{th}$ mode of the Time Series model f;

$H_{pred,m}^{t}$ is the water stage forecast correction of the current time corresponding to the water stage error estimate $\epsilon_{TSM,m}^{t}$ of the current time generated by the $m^{th}$ mode of the Time Series model f;

$N_{model}$ is the model number of the Time Series; and $H_{pred,TS}^{t}$ is the water stage forecast correction of the current time generated by the Time Series model f.

3. The method of claim 1, wherein correcting the predicted water stage of the next time according to the water stage forecast correction of the next time and the predicted water stage of the next time is performed according to the following equation:

$$H_{corr}^{t+1} = H_{pred}^{t+1} + \epsilon_{comb}^{t+1};$$

wherein $H_{corr}^{t+1}$ is a corrected predicted water stage of the next time.

* * * * *